Oct. 15, 1940.  A. R. WURTELE  2,218,321
INTERNAL COMBUSTION ENGINE
Filed June 16, 1936   2 Sheets-Sheet 1
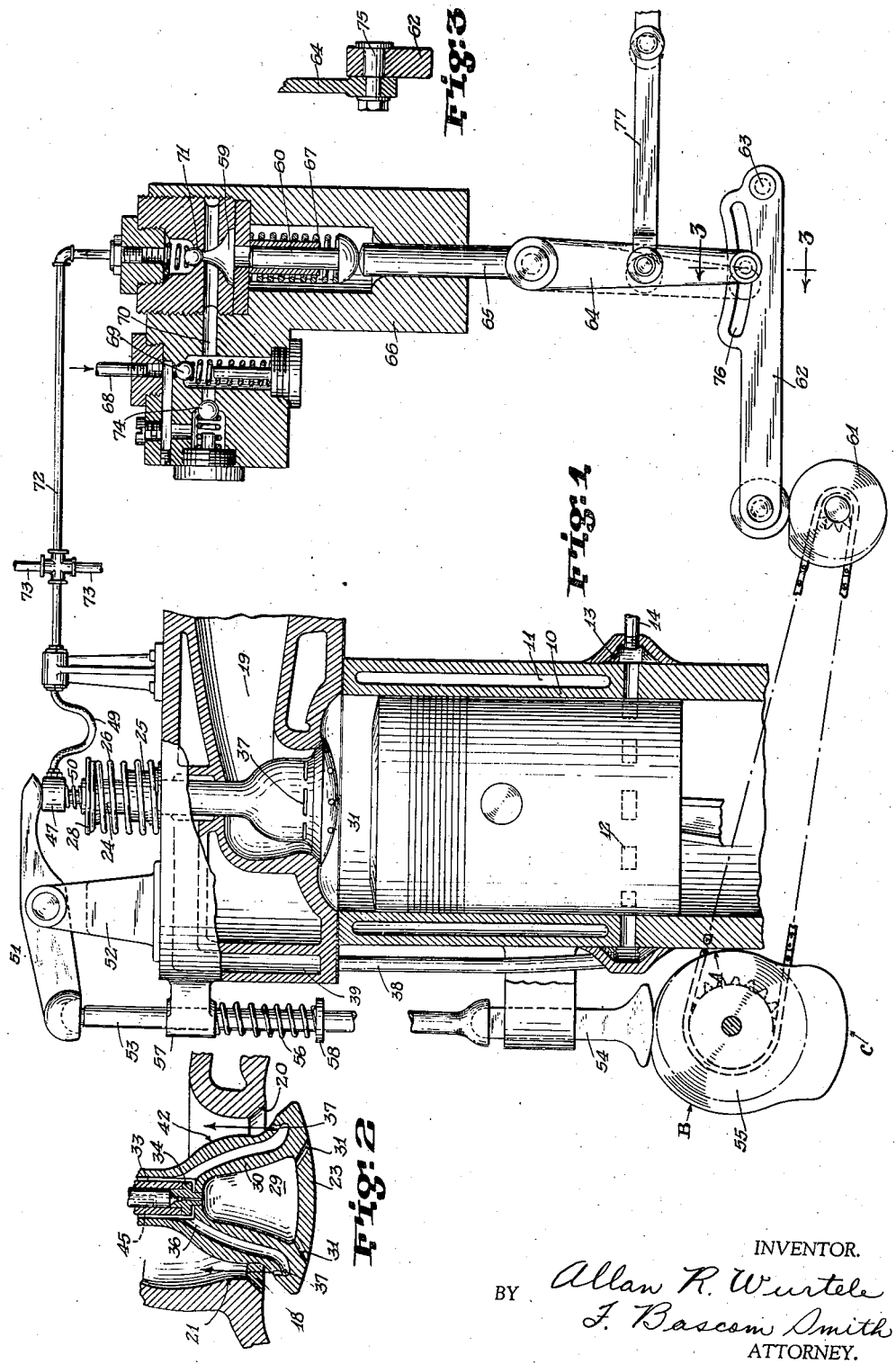
INVENTOR.
BY Allan R. Wurtele
F. Bascom Smith
ATTORNEY.

Oct. 15, 1940.  A. R. WURTELE  2,218,321
INTERNAL COMBUSTION ENGINE
Filed June 16, 1936  2 Sheets-Sheet 2
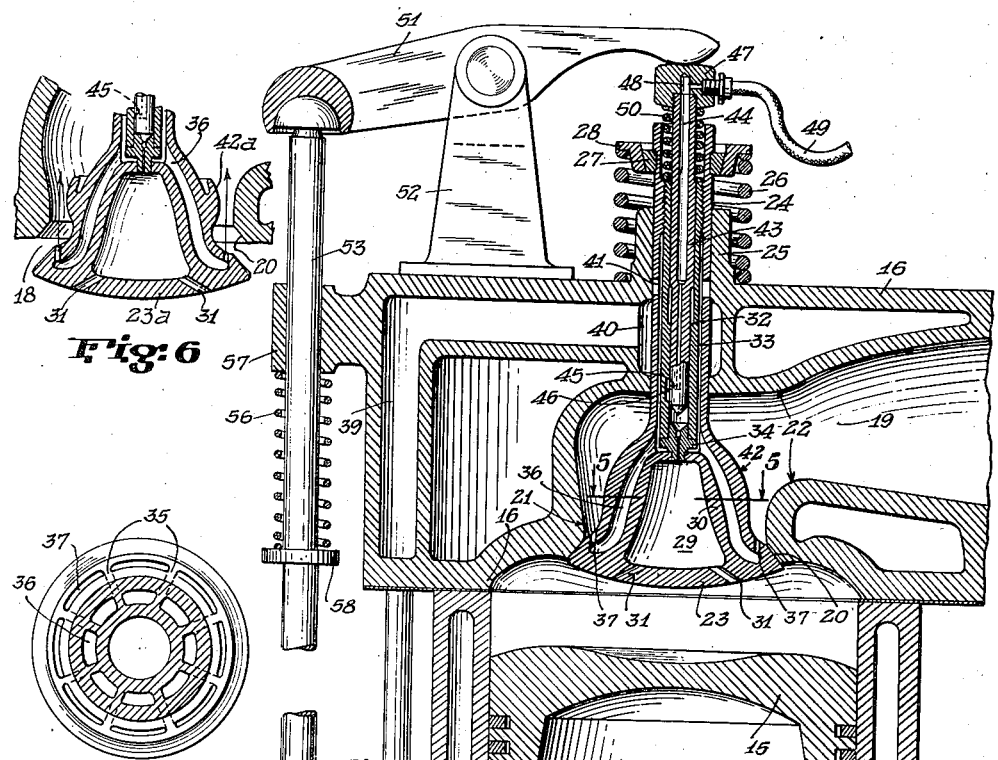
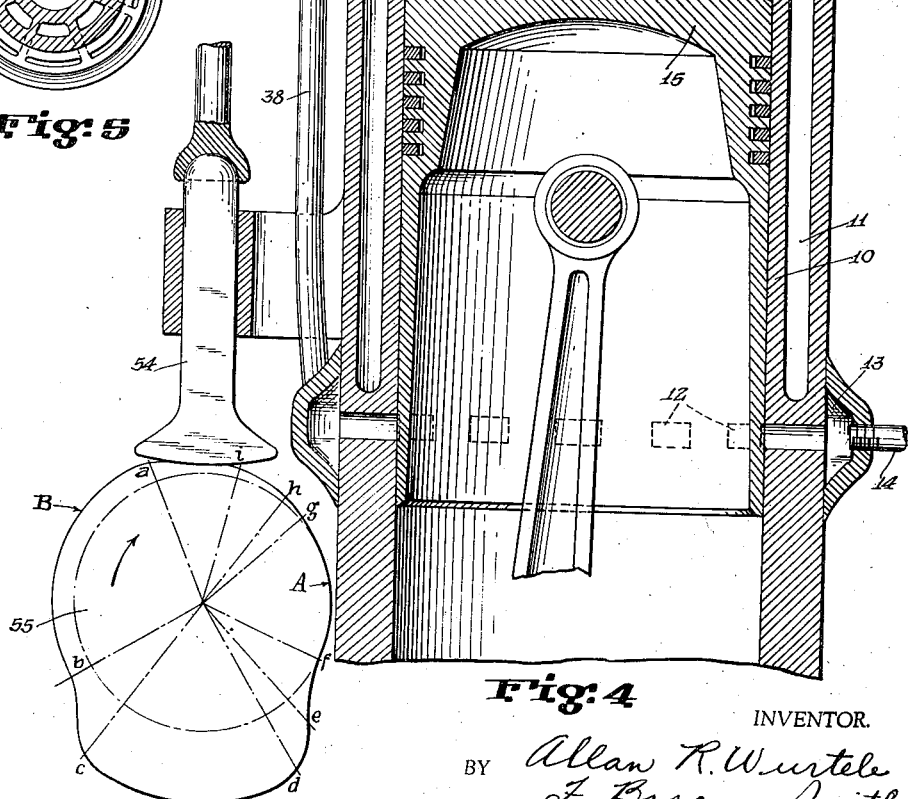
INVENTOR.
BY Allan R. Wurtele
F. Bascom Smith
ATTORNEY.

Patented Oct. 15, 1940

2,218,321

UNITED STATES PATENT OFFICE 2,218,321

INTERNAL COMBUSTION ENGINE

Allan R. Wurtele, New Roads, La.

Application June 16, 1936, Serial No. 85,447

9 Claims. (Cl. 123—32)

This invention relates to internal combustion engines and more particularly to engines of the solid fuel injection type, commonly known as Diesel engines.

One of the objects of the present invention is to provide a novel two-cycle, exhaust valve-in-head, uni-flow, port scavenging, solid fuel injection engine wherein fuel is injected by novel means into the power cylinders through the exhaust valves and the medium employed for cooling said valves is also utilized for assisting in the removal of exhaust gases from the power cylinders to form a "push-pull" scavenging system.

In two-cycle engines heretofore provided, much difficulty has been experienced in properly scavenging the power cylinders, since scavenging must take place in the short space of not more than one-third of a cycle. It is for this reason that no efficient high-speed engine of this type has been developed, and it is accordingly another object of this invention to provide a novel method for scavenging the cylinders of an internal combustion engine whereby more rapid scavenging and a higher mean effective pressure will result.

Another object of the invention is to provide a novel internal combustion engine which is so constructed that through scavenging, adequate super-charging and most advantageous fuel injection may be realized, and more efficient operation thereby attained.

Still another object is to provide a novel valve for an internal combustion engine or the like which may be cooled in a novel manner.

A further object of the invention is to provide a novel, simplified fuel-injection system for an internal combustion engine of the solid fuel injection type.

A still further object is to provide a novel cylinder head and exhaust valve combination whereby scavenging is greatly facilitated.

Another object is to provide a novel internal combustion engine wherein the cooperation of a simplified fuel injection system, novel valve cooling means, and a more efficient method of scavenging than heretofore employed results in increased over-all efficiency and increased horsepower output per unit of weight as well as in the simplification of construction and operation by minimizing the number of moving parts.

The above and further objects and novel features of the invention will more fully appear from the following detail description when taken in connection with the accompanying drawings, describing the "push-pull" scavenging system. It is to be expressly understood, however, that the drawings are for the purpose of illustration only and are not designed as a definition of the limits of the invention, reference being primarily had for this latter purpose to the appended claims.

In the drawings, wherein like reference characters refer to like parts throughout the several views, Fig. 1 is a somewhat diagrammatic end elevation, partly in section and with parts broken away, illustrating one form of engine embodying the present invention;

Fig. 2 is a detail sectional view, with parts broken away, showing one form of the novel valve comprehended by the invention in open position;

Fig. 3 is a detail sectional view, taken on line 3—3 of Fig. 1;

Fig. 4 is a diagrammatic end elevation, partly in section and with parts broken away, showing one cylinder of a multi-cylinder engine embodying the invention;

Fig. 5 is a section taken on line 5—5 of Fig. 4; and

Fig. 6 is a detail view, partly in section and with parts broken away, showing a modified valve and cylinder head construction.

Referring to the drawings, the present invention is illustrated by way of example in the form of a two-cycle internal combustion engine wherein inlet or scavenging ports are provided in the cylinder walls and controlled by the piston and wherein valve controlled exhaust ports are provided in the cylinder heads, preferably centrally disposed with respect to the cylinder. In the embodiment shown, the invention comprises a plurality of cylinders 10 (only one being shown), each having a cooling fluid jacket 11 and a plurality of circumferentially spaced intake ports 12 adjacent the lower end of the combustion space therein. Said ports connect the interior of the cylinder with an annular air chamber 13 which in turn has communication with a source of compressed air (not shown) through a conduit 14. A piston 15 is adapted to reciprocate in cylinder 10, the same being connected to a crankshaft (not shown) in any well-known manner, and controls the opening and closing of ports 12.

Mounted on the upper end of cylinder 10 and secured thereto in any suitable manner is a novel cylinder head 16 which has a cooling chamber for the circulation of a cooling medium and a centrally disposed exhaust port 18. The exhaust gas passage 19 connecting port 18 to an exhaust manifold (not shown) or to atmosphere has a novel contour and cooperates in a novel manner with the exhaust valve to facilitate scavenging and hence increase the mean effective pressure and the efficiency and power output of the engine, as will more fully appear hereafter. As shown, a valve seat 20 surrounds port 18 and the wall of passage 19 just above said seat is provided with an annular bulge 21 which is, in effect, a curved continuation of said seat. In the bend from vertical to horizontal in passage 19, the cross-sectional area thereof is a minimum, thereby giving the passage the shape of a venturi with said reduced area constituting a throat 22.

A valve in which novel fuel injection and cooling means are combined is provided for controlling exhaust port 18 and is constructed in a novel manner so that the cooling means and the shape of the valve cooperate with cylinder head 16 to facilitate and speed up the scavenging of power cylinder 10. As shown in Figs. 1 to 5, inclusive, said valve has an enlarged head portion 23 and a hollow stem 24 which slidably extends through a guide 25 formed in cylinder head 16. The head of valve 23, 24 is adapted to be yieldingly held in engagement with seat 20 by a coil spring 26 interposed between cylinder head 16 and a pair of cooperating tapered keepers 27 and 28, the innermost of which engages a groove adjacent the upper end of stem 24. A precombustion chamber 29, the walls 30 of which are spaced from the outer wall of valve head 23, is formed within said head and has constant communication with cylinder 10 through a plurality of ports 31. The latter may extend radially or tangentially with respect to the cylinder axis to insure thorough and even distribution as well as tubulence of the charge in the cylinder combustion chamber. A hollow barrel or cylinder 32 having an outer diameter somewhat less than the inner diameter of stem 24 is centrally disposed in the latter and has an enlarged upper portion which threadedly engages the inner wall of the stem, thereby forming an annular space 33 for the circulation of a cooling medium. The lower end of barrel 32 is connected to precombustion chamber 29 by means of injection nozzle 34 which has reduced portions extending into the hollow center of the barrel and into an opening in the top of the precombustion chamber.

For the purpose of strengthening valve 23, 24, to increase the rigidity thereof and prevent warping under the influence of temperature changes, and to facilitate cooling of the same, wall 30 of precombustion chamber 29 is rigidly connected to the outer wall of valve head 23 by a plurality of circumferentially spaced radially extending ribs 35 (Fig. 5). The compartments 36 formed between said ribs constitute continuations of chamber 33 and are provided with arcuate discharge slots 37 at the lower ends thereof, the side walls of said slots, as shown, being vertical. Ribs 35 thus present an increased surface contact for the cooling medium which is to be circulated in chamber 33, 36 and constitute means for conducting heat from the wall of precombustion chamber 29 to the relatively cooler outer wall of the valve, thereby insuring a more even temperature in the metal of the valve assembly.

In the form of the invention shown, air under pressure is employed as the cooling medium, said air being conducted from chamber 13 or other suitable source through a conduit 38, a passage 39 in cylinder head 16, an annular space 40 in said head around the valve stem 24, and a plurality of ports 41 in said stem to cooling chamber 33, 36. Ports 41 are preferably located so that the same are covered by valve guide 25 when valve 23, 24 is in closed position, thereby admitting cooling fluid to the cooling chamber of the valve only when the latter is in open position. Other suitable cooling mediums may be employed in lieu of air, such as, for example, steam generated in a boiler which may be heated by the exhaust gases of the engine.

The wall of valve head 23 at a point immediately above slots 37 has an annular convex porvex portion, as at 42, which, when the valve is in open position (Fig. 2), cooperates with surface 21 of cylinder head 16 to form an annular passage having a Venturi cross-section. The axis of the throat of said venturi is preferably vertically above slots 37 so that the valve cooling air will pass upwardly therethrough at a high velocity. An ejector or aspirator action will thus be created when valve 23, 24 is open which is effective to pull the burned gases out of cylinder 10, said gases being entrained by the cooling air after the latter has passed through the valve and absorbed heat therefrom. This suction action is facilitated by the Venturi passage 21, 42 in which the velocity of the cooling fluid is increased and whereby a low pressure area is established in passage 19 just above said venturi. Passage 19, also having a Venturi shape, the throat of which is designated by 22, has a like, although it is believed a less prominent, effect upon the removal of the burned gases from cylinder 10. The exhaust gases are thus pushed outwardly through port 18 by compressed air entering cylinder 10 through ports 12 and pulled outwardly by the cooling medium employed in valve 23, 24. This "push-pull" scavenging insures a more rapid and thorough removal of the burned gases from the cylinder and thus renders high-speed, two-cycle engines more feasible and efficient. The cooling medium serves a further useful purpose in cooling the exhaust gases and thereby reducing the heating effect thereof on the walls of passage 19 and the outer walls of valve 23, 24.

Novel fuel injection means are provided in combination with valves 23, 24, said means comprising common mechanism for operating the valve and fuel pump means therein in such a manner that said pump means also constitute distributor means. As illustrated, a plunger 43 slidably extends into the hollow center of barrel 32, the former constituting a fuel pump piston and the latter a fuel pump cylinder, as well as the inner wall of cooling space 33. A small, centrally disposed fuel passage 44 is provided in plunger 43, the same having communication with the interior of cylinder 32 through a radial passage 45 and a recess 46 in the wall of cylinder 32 when the bottom of said plunger is above the lowermost portion of the recess. A head 47 is threadedly received by the upper end of plunger 43 and has a passage 48 through which passage 44 communicates with a flexible conduit 49 that is threadedly connected to said head. Plunger 43 is adapted to be held in raised position by a coil spring 50 which extends into an annular recess between the plunger and stem 24 and is interposed between the upper end of spindle 32 and head 47.

Spring 50 is effective to hold head 47 of plunger 43 in engagement with a tappet or lever 51 that is pivotally mounted on a bracket 52 and is adapted to be actuated by a push rod 53 which is in turn actuated by a cam follower 54 interposed between said rod and a cam 55. The latter is preferably formed integrally with the engine crankshaft (not shown), the same constituting one of the cheeks thereof, but is illustrated diagrammatically in the drawings for the purpose of clarity as being at one side of the center line of the engine. Follower 54 is yieldingly held in engagement with the cam by a coil spring 56 which is interposed between a guide 57 for rod 53 and a collar 58 on said rod. Cam 55 comprises a low portion A which determines the uppermost position of plunger 43, an intermediate lobe B that determines the stroke of the plunger in cylinder 32, and a lobe C that is effective to bring head 47 into contact with the upper end of valve stem 24 and open valve 23, 24 against the efforts of spring 26.

The remainder of the novel fuel injection system and control means therefor comprises a fuel measuring pump 66 adapted to be actuated through the medium of a cam drivably associated with the engine crankshaft, said pump being shown in diagrammatic relation to the engine in Fig. 1. The novel fuel pump provided in combination with the valve fuel pumps 32, 43 insures accurate control of the fuel charge and the delivery of an equal charge to each of a plurality of cylinders in a predetermined cycle. In the illustrated embodiment, said measuring pump is constituted by a pressure chamber 59 in which a piston 60 is adapted to be reciprocated by a cam 61 acting through a linkage consisting of a horizontal arm 62 having a fixed pivot 63, a vertically disposed link 64, and a push rod 65 pivotally connected to link or arm 64 and constrained to move in a straight line by a guide in pump housing 66. Plunger 60 is yieldingly held in engagement with rod 65 by a coil spring 67.

Upon downward movement of plunger 60 by spring 67, fuel is drawn into the pump from a suitable source (not shown) through inlet conduit 68, a spring-pressed, one-way valve 69 and passage 70 which is in constant communication with chamber 59. Upward movement of plunger 60 forces fuel from said chamber past a spring-pressed, ball-check or non-return valve 71 and through a conduit 72 which has a plurality of branches 73 connected to flexible conduits 49 leading to the valve pump plungers 43. By way of example, the fuel supply pipe 72 has three branches for an engine block with three cylinders but it will be understood that any number may be used. If desired, a relief valve such as ball check valve 74 may be provided between the pump pressure chamber 59, 70 and inlet 68 to protect the fuel lines 72, 73 against any excessive pressure.

Cam 61 is so designed and driven at such speed relative to the engine crankshaft that the plunger 60 will be actuated as many times during each revolution of the crankshaft as there are engine cylinders. Each stroke of said plunger causes a measured fuel charge to be delivered to one of the pumps 32, 43 which, as will be more fully pointed out hereafter, serve as distributors. Thus, if a one-lobe cam is employed, as shown, the same is driven at three or four times the speed of the engine crankshaft for a three or four cylinder engine, respectively.

The size of the fuel charge delivered to each cylinder is determined by the stroke of plunger 60. Means are accordingly provided for varying the length of said stroke and hence the speed and power output of the engine. For this purpose, the lower end of arm 64 is slidably connected to arm 62 by means of a pin 75 which extends through an arcuate slot 76 in arm 62. As the lower end of link 64 is moved to the left, as seen in Fig. 1, away from pivot 63, the stroke of plunger 60 will be proportionately increased, the vertical movement of the outer end of arm 62 being constant, as determined by the lobe of cam 61. The relative positions of arms 62 and 64 may be adjusted either manually or by a suitable governor for the purpose set out above through a link 77 pivotally connected to arm 64.

A complete cycle of operation of the engine is as follows: Starting with the parts in the positions illustrated in Figs. 1 and 4, piston 15 is illustrated approaching the top of its up-stroke and follower 54 is riding up onto lobe B of cam 55, thereby moving plunger 43 downwardly in cylinder 32 and forcing the fuel charge therein through atomizing nozzle 34 into precombustion chamber 29. The air in the latter, heated during its compression by piston 15, ignites the fuel and causes the same to expand through ports 31 into cylinder 10 where said partially burned fuel is intimately mixed with additional combustion supporting air and completely burned. The expanding gases of combustion force piston 15 downwardly and during most of said downward movement, follower 54 engages the dwell of lobe B, i. e., from a to b, and plunger 43 remains stationary with head 47 just engaging valve stem 24. Just prior to or at the time that ports 12 are uncovered by piston 15, follower 54 engages lobe C of the cam, thereby opening exhaust valve 23, 24 during rotation of said cam from b to c. The valve remains in full open position from c to d, during which time compressed air from chamber 13 enters valve 23, 24 through ports 41 and is discharged therefrom through ports 37 and passes upwardly through venturi 21, 42, thereby cooling the valve and pulling exhaust gases out of cylinder 10 as heretofore disclosed. At the same time, compressed air enters ports 12, thereby pushing the exhaust gases upwardly and charging the cylinder with a supply of fresh air. The cylinder is thus completely and quickly scavenged by simultaneously driving and pulling burned gases therefrom.

Valve 23, 24 is permitted to move to closed position as follower 54 rides off lobe C from d to e and, if desired, this may be before ports 12 are closed by piston 15 on its up-stroke so that additional air will be supplied to the cylinder for supercharging the same. As piston 15 continues to move upwardly, compressing the combustion supporting air therein, follower 54 continues to ride off lobe C from e to f, i. e. to the low portion A of the cam, thus permitting fuel pump plunger 43 to be lifted by spring 50 and place recess 46 and fuel passage 44, 45 in communication with cylinder 42. This inlet remains open during movement of the cam from f to g and it is during this interval that a stroke of plunger 60 of the fuel measuring pump is effected by cam 61, thereby forcing a fuel charge into the bottom of cylinder 32 at a comparatively low pressure. The interval during which the fuel inlet 46 is open occurs at different times for each engine cylinder or at least only one of such inlets is open during each stroke of pump plunger 60 so that the fuel pumps 32, 43 themselves control the distribution of the fuel to the cylinders and thus obviate the necessity for a distributor. Since only a single fuel measuring pump is employed for a plurality of cylinders, the delivery of an equal charge to each is insured except, of course, during acceleration of the engine.

As follower 54 begins to ride up onto lobe B again, plunger 43 is moved downwardly covering recess 46 during movement of the cam from g to h. Continued movement of the cam from h to i causes plunger 43 to compress any gases or vapor in cylinder 32 and thereafter during movement from i to a to force the fuel charge into chamber 29, whereupon the cycle of operation is repeated.

A modification of the novel valve is illustrated in Fig. 6 wherein an annular upwardly extending curved lip 42a is provided on valve head 23a in lieu of but for the same purpose as annular convex surface 42 on valve head 23.

There is thus provided a novel internal combustion engine wherein common means are provided for controlling the operation of the exhaust valves, the cooling means for said valves, and the fuel injection means therein, and wherein the novel valve cooling means assist in scavenging the power cylinders and individual fuel pumps which form the inner walls of the cooling chamber in the valves at each cylinder constitute distributor means in a novel fuel injection system. The scavenging rate is greatly enhanced and high speed operation of an internal combustion engine rendered more efficient. Additionally, the number of moving parts is greatly reduced and those employed are simple and rugged, thereby decreasing the initial and up-keep costs, as well as the possibility of failure. The novel valve employed is so constructed and cooled as to render uni-flow, exhaust valve-in-head scavenging practical without danger of failure in the valve or cylinder head.

Although only one embodiment of the invention has been illustrated and described in detail, it is to be expressly understood that the same is not limited thereto but that the same may take other forms without departing from the spirit and scope of the invention. For example, the invention may be embodied in a four-cycle engine, if desired, and various changes may be made in the design and arrangement of parts illustrated, as will now be apparent to those skilled in the art. For a definition of the limits of the invention, reference will be had primarily to the appended claims.

What is claimed is:

1. In an internal combustion engine, a cylinder, a cylinder head therefor having a port and an exhaust gas passage therein, a valve for said port having a cooling space in communication with said passage, means in said valve including pump means for delivering fuel to said cylinder, a source of gaseous cooling medium adapted to communicate with the cooling space in the valve only when the latter is opened, and common means for successively actuating said fuel pump means and said valve.

2. In an internal combustion engine, a plurality of power cylinders having ports in the walls thereof, a piston operable in each of said cylinders and adapted to control said ports, a source of compressed air communicating with said ports, a cylinder head for each cylinder having a port and an exhaust gas passage therein, a valve for each of said cylinder head ports having a cooling chamber the lower end of which is in communication with said passage, the walls of said valve and passage forming an annular passage having a Venturi cross-section when the valve is open, means for injecting a gaseous cooling medium into said chamber when the valve is open, said fluid being discharged from said chamber through said annular Venturi passage, fuel injection means in each valve comprising a pump cylinder and a plunger operable in said pump cylinder, connecting means between each of said pump cylinders and a power cylinder, a single pump exterior of the valve, means connecting said last-named pump and said pump cylinders, said last-named connecting means being controlled by said plungers, means for actuating said exterior pump at predetermined intervals, and common means for opening each of said valves and actuating the plunger therein whereby only one of the pump cylinders is in communication with said exterior pump during each stroke of the latter.

3. In apparatus of the class described, a valve having an enlarged head and a hollow stem, a precombustion chamber in said head, a plurality of ribs connecting the walls of said chamber and head, and fuel supply means centrally disposed in said stem communicating with said precombustion chamber and forming the inner wall of an annular space in said stem which has communication with the space between the walls of said precombustion chamber and valve head, the latter having openings therein connecting said last-named space with the atmosphere exterior with the valve.

4. In an internal combustion engine, a cylinder having a port, a valve for said port having an enlarged head portion and a hollow stem, means in said valve for delivering fuel to said cylinder, said means and the walls of said valve forming an annular cooling space, the latter having openings adjacent the upper and lower ends thereof, means for supplying a cooling medium to said cooling space, and means for supplying fuel to said fuel delivery means.

5. In an internal combustion engine, a power cylinder, a cylinder head therefor having a port and an exhaust gas passage, a valve for said port, fuel supply means in said valve for delivering fuel to said cylinder and forming the inner wall of an annular cooling space in said valve, said space having communication with said exhaust gas passage, means for supplying a cooling medium to said space at a point adjacent the upper end thereof, and means for supplying fuel to said fuel supply means.

6. In an internal combustion engine, a cylinder having a port, a valve for said port, means for injecting fuel through said valve into the cylinder comprising a fuel pump in said valve, pump means exterior of the valve for supplying fuel to said first-named pump, common means for successively actuating said first-named fuel pump and valve, means for actuating said supply pump means in a predetermined manner relative to said first-named fuel pump, and means for controlling said supply pump means to vary the size of the fuel charge delivered to said first-named fuel pump.

7. In an internal combustion engine, a plurality of cylinders each having a port, a valve for each of said ports, fuel injection means including a fuel pump in each valve for injecting fuel into said cylinders, common means for actuating each of said valves and the fuel pump therein, and a single fuel supply pump exterior of the valves for pumping measured quantities of fuel directly to said first-named fuel pumps in a predetermined cycle.

8. In an internal combustion engine, a power cylinder having a port, a valve for said port, fuel injection means in said valve including a fuel pump cylinder having a recess in the wall thereof, a plunger operable in said pump cylinder and having a fuel passage therein communicating with said recess, means connecting said pump cylinder and said power cylinder, fuel supply pump means exterior of the valve for supplying measured quantities of fuel through said passage and recess to said pump cylinder, and means for actuating said plunger to cover said recess and thereafter pump fuel from the pump cylinder through said connecting means.

9. In an internal combustion engine, a cylinder, a cylinder head therefor having a port, an exhaust gas passage and a valve guide therein, said guide having an enlarged portion intermediate the ends thereof, means connecting said latter portion with a source of gaseous cooling medium under pressure, a valve for said port having a hollow stem slidably extending through said guide and a cooling space in communication with said passage, said stem having one or more radially extending ports therein, means in said valve including pump means for delivering fuel to said cylinder, and common means for successively actuating said fuel pump and said valve whereby said radial ports are moved into and out of registry with said enlarged portion of the valve guide.

ALLAN R. WURTELE.